US 6,401,128 B1

(12) United States Patent
Stai et al.

(10) Patent No.: US 6,401,128 B1
(45) Date of Patent: Jun. 4, 2002

(54) SYSTEM AND METHOD FOR SENDING AND RECEIVING FRAMES BETWEEN A PUBLIC DEVICE AND A PRIVATE DEVICE

(75) Inventors: Jeffery Stai, Placentia; Eric Griffith, Yorba Linda; Vincent W. Guan, Placentia; David C. Banks, Pleasanton; Ding Long Wu, San Jose; Jieming Zhu, Fremont, all of CA (US)

(73) Assignee: Brocade Communiations Systems, Inc., San Jose, CA (US)

( * ) Notice: Subject to any disclaimer, the term of this patent is extended or adjusted under 35 U.S.C. 154(b) by 0 days.

(21) Appl. No.: 09/370,095

(22) Filed: Aug. 6, 1999

Related U.S. Application Data

(60) Provisional application No. 60/095,823, filed on Aug. 7, 1998.

(51) Int. Cl.$^7$ ................................................ G06F 13/00
(52) U.S. Cl. ........................................................ 709/236
(58) Field of Search ................................ 709/236, 301; 710/4; 712/1; 370/230, 349, 352, 351; 395/831

(56) References Cited

U.S. PATENT DOCUMENTS

| | | | |
|---|---|---|---|
| 5,519,695 A | * | 5/1996 | Purohit et al. |
| 5,533,026 A | * | 7/1996 | Ahmadi et al. ............. 370/349 |
| 5,610,745 A | * | 3/1997 | Bennett |
| 5,655,153 A | * | 8/1997 | Sandorfi |
| 5,748,612 A | * | 5/1998 | Stoevhase et al. |
| 5,805,920 A | * | 9/1998 | Sprenkle et al. |
| 5,805,924 A | * | 9/1998 | Stoevhase |
| 5,828,475 A | * | 10/1998 | Bennett et al. |
| 5,831,985 A | * | 11/1998 | Sandorfi |
| 5,845,149 A | * | 12/1998 | Husted et al. |
| 5,872,822 A | * | 2/1999 | Bennett |

(List continued on next page.)

FOREIGN PATENT DOCUMENTS

| | | | |
|---|---|---|---|
| EP | 0 697 801 A2 | * | 2/1996 |
| EP | 0 711 053 A1 | * | 5/1996 |
| EP | 0 856 969 A1 | * | 8/1998 |

OTHER PUBLICATIONS

Fibre Channel Physical and signaling Interface (FC–PH), Rev. 4.3, working draft proposed America National Standard for Information Systems, Jun. 1, 1994 ("Ref. S").*

(List continued on next page.)

Primary Examiner—David Wiley
(74) Attorney, Agent, or Firm—Wong, Cabello, Lutsch, Rutherford & Brucculeri P.C.

(57) ABSTRACT

A system and method for sending frames between a public device and a private device comprise a phantom device mapping, an address translation, a frame payload translation, and a CRC regeneration. The system and method assign a phantom AL_PA for the public device and establishes a phantom device mapping between the phantom AL_PA and the public device's Port_ID. With the phantom device mapping, the present invention directs all communication between the public device and the private loop device as if the communication were between a phantom device and the private device. Specifically, the system and method comprise a public-to-private address translation in one direction and a private-to-public address translation in the other direction. During the public-to-private address translation process, the source address of the frame is converted to a phantom AL_PA. The public-to-private address translation uses a Port_ID to phantom AL_PA mapping table and finds an entry where the Port_ID matches the source address. The public-to-private address translation replaces the source address of the frame with the phantom AL_PA of the matched entry, and the destination address with the AL_PA only of the destination device. The private-to-public address translation replaces the destination address of the frame with the Port_ID of the matched entry, and the source address with the fabric assigned address of the private device.

18 Claims, 11 Drawing Sheets

U.S. PATENT DOCUMENTS

| | | | | |
|---|---|---|---|---|
| 5,890,011 | A | * | 3/1999 | Abbondanzio et al. |
| 5,959,994 | A | * | 9/1999 | Boggs et al. |
| 6,009,476 | A | * | 12/1999 | Flory et al. ................. 709/301 |
| 6,014,370 | A | * | 1/2000 | Komatsu et al. |
| 6,014,383 | A | * | 1/2000 | McCarty |
| 6,014,715 | A | * | 1/2000 | Stoevhase |
| 6,067,581 | A | * | 5/2000 | Porterfield ..................... 710/4 |
| 6,105,122 | A | * | 8/2000 | Muller et al. .................. 712/1 |
| 6,118,776 | A | * | 9/2000 | Berman ...................... 370/351 |
| 6,175,917 | B1 | * | 1/2001 | Arrow et al. ................... 713/1 |
| 6,185,203 | B1 | * | 2/2001 | Berman ...................... 370/351 |
| 6,226,751 | B1 | * | 5/2001 | Arrow et al. |
| 6,243,815 | B1 | * | 6/2001 | Antur et al. |
| 6,304,906 | B1 | * | 10/2001 | Bhatti et al. |

OTHER PUBLICATIONS

Fibre Channel Switch Fabric (FC–SW), Rev. 3.3, NCITS working draft proposed America National Standard for Information Technology, Oct. 21, 1997 ("Ref. T").*

Fibre Channel Fabric Loop Attachment (FC–FLA), Rev. 2.7, NCITS working draft proposed Technical Roport, Aug. 12, 1997 ("Rev. V").*

Fibre Channel Private Loop SCSI Direct Attach (FC_FLDA), Rev. 2.1, X3 working draft proposed Technical Report, Sep. 22, 1997 ("Ref. W").*

Fibre Channel Arbitrated Loop (FC–AL–2), Rev. 7.0, NCITS working draft proposal America National Standard for Information Technology, Apr. 1, 1999 ("Ref. X").*

* cited by examiner

| | Port Max-Port | | Port-1 | Port-0 |
|---|---|---|---|---|
| 0 | | | 1 | |
| 1 | | | | |
| . | | | | |
| . | | | | |
| . | | | | |
| . | | | | |
| . | | | | |
| . | | | | |
| 125 | | | | |

FIGURE 8

| | |
|---|---|
| 0 | 10 x 202001 sid_0    sid_0 |
| . | |
| . | |
| . | |
| . | |
| . | |
| . | |
| 125 | sid_125 |

| Port Max-Port | | Port-1 | Port-0 |
|---|---|---|---|
| | ..... | EF | |

FIGURE 9

SYSTEM AND METHOD FOR SENDING AND RECEIVING FRAMES BETWEEN A PUBLIC DEVICE AND A PRIVATE DEVICE

RELATED APPLICATIONS

The subject matter of the present application is related to and claims priority from the subject matter of U.S. patent application Ser. No. 60/095,823, entitled "Phantom Mode," filed on Aug. 7, 1998.

FIELD OF THE INVENTION

This invention relates to a method and apparatus for receiving and transmitting data in a network communication system, and more particularly, to a method and apparatus of receiving and transmitting frames between a public device and a private device in a Fibre Channel network communication system.

BACKGROUND OF THE INVENTION

The Fibre Channel family of standards (developed by the American National Standards Institute (ANSI)) defines a high speed communications interface for the transfer of large amounts of data between a variety of hardware systems such as personal computers, workstations, mainframes, supercomputers, and storage devices that have Fibre Channel interfaces. Use of Fibre Channel is proliferating in client/server applications which demand high bandwidth and low latency I/O such as mass storage, medical and scientific imaging, multimedia communication, transaction processing, distributed computing and distributed database processing applications.

Fibre Channel uses one, or a combination, of several topologies (e.g., point-to-point topology, a fabric topology, or a loop topology) to establish a logical point-to-point serial channel. The Fibre Channel point to point topology directly connects two Fibre Channel systems. The Fibre Channel fabric topology uses a switching fabric, which is constructed from one or more Fibre Channel switches, to provide a bi-directional connection from one N_Port to another. The Fibre Channel loop topology is an arbitrated loop with ring connections that provide loop-capable device nodes (NL_Ports) the ability to arbitrate access to a shared bandwidth.

Devices coupled to a fabric may be either a public device (for example, a device coupled to a fabric via an F_Port or FL_Port) or a private loop device (for example, a device coupled to a fabric via an FL_Port and not capable of FLOGI). In conventional Fibre Channel systems, if a public device and a private loop device are not coupled to the same loop, the public device cannot communicate with the private loop device but can only communicate with other public devices; similarly, the private loop device cannot communicate with the public device but can only communicate with other devices coupled to the same loop.

Since conventional Fibre Channel switching systems and methods do not allow public devices to send frames to and receive frames from private loop devices, there is a need for an improved switching system and method which allows communication between private loop devices and public devices.

SUMMARY OF THE INVENTION

The present invention overcomes the deficiencies and limitations of the prior art with a novel method and apparatus for sending and receiving frames between a public device and a private device. The present invention advantageously assigns a public device a phantom address mapping the public device to a phantom device. When a private device sends frames to or receives frames from a public device, it does so by sending frames to and receiving frames from the phantom device. The phantom device is virtually coupled to the private loop, and the FL_Port to which the loop device is coupled acts as an agent for the public device. Thus, all communication between the public device and the private device occurs as if the communication were between the phantom device and the private device.

In one aspect of the invention, a system and method for sending frames between a public device and a private device comprises a phantom device mapping, an address translation, a frame payload translation, and a CRC regeneration. The present invention assigns a phantom AL_PA for the public device and establishes a phantom device mapping between the phantom AL_PA and the public device's Port_ID. With the phantom device mapping, the present invention directs all communication between the public device and the private loop device as if the communication were between a phantom device and the private device. Specifically, the present invention accomplishes this by performing a public-to-private address translation in one direction and a private-to-public address translation in the other direction.

During a public-to-private address translation process, the destination address of a frame transmitted from a public device is evaluated to determine if the destination address is an address for a private loop device using a device type table lookup. If the lookup result indicates that the destination device is a private loop device, then the source address of the frame is converted to a phantom AL_PA. Preferably, the public-to-private address translation uses a Port_ID to phantom AL_PA mapping table and finds an entry where the Port_ID matches the source address. The public-to-private address translation replaces the source address of the frame with the phantom AL_PA of the matched entry, and the destination address with the AL_PA only of the destination device. Generally, the new destination address 214 is created by replacing the upper two byte (LL LL) of the original destination 204 with (00 00). Thus, after translation, the frame contains a new destination address and a new source address, where both addresses are preferably of the form {0x0000, AL_PA}. Thus, the present invention enables a public device to appear as a phantom private device on a loop and therefore allows a frame sent from the public device to the private loop device to be transmitted to the loop.

During a private-to-public address translation process, the destination address of a frame transmitted from a private loop device is evaluated to determine if the destination address is a phantom device, preferably, using a device type table lookup. If the lookup result indicates that the destination address is a phantom address, then the destination address is converted to a Port_ID of the public device. Preferably, the private-to-public address translation uses a phantom AL_PA $(PP)_n$ in the destination address (00 00 $PP)_n$. The private-to-public address translation replaces the destination address of the frame with the Port_ID of the matched entry, and the source address with the fabric assigned address of the private device. Generally, the new source address is created by replacing the upper two bytes (00 00) of the original source address with (LL LL). Thus, after translation, frame contains the actual destination address of the public device and a full fabric source address for the private loop device. Therefore, the present invention advantageously enables a private loop device to appear as a public loop device and therefore, to allow frames sent from the private loop device to the public device to be transmitted across the fabric.

BRIEF DESCRIPTION OF THE DRAWINGS

FIG. 8 is a block diagram of a private device table used in a switch-based public-to-private address translation mapping of another preferred embodiment in accordance with the present invention.

FIG. 9 is a block diagram of a preferred embodiment of a Content Addressable Memory used in a switch-based public-to-private address translation in accordance with the present invention.

DETAILED DESCRIPTION OF PREFERRED EMBODIMENTS

Figure 1:
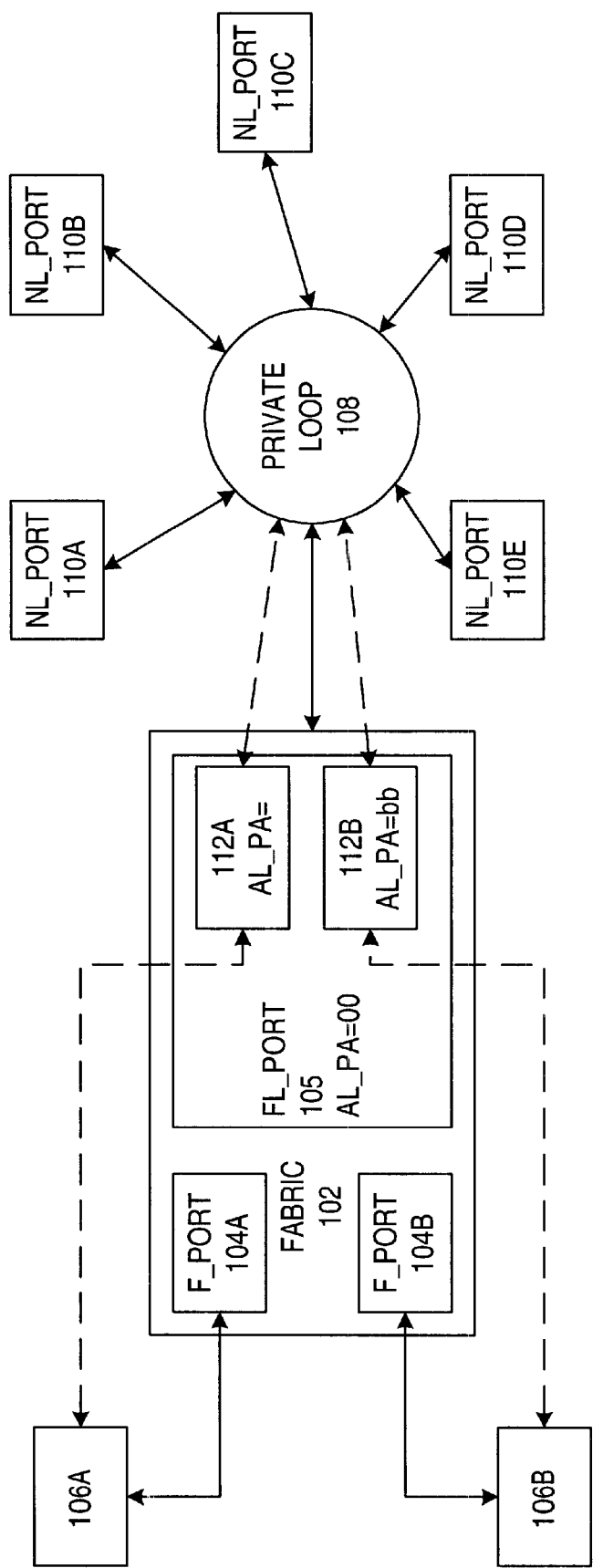
FIG. 1 is an overview of a preferred embodiment of a Fibre Channel network communication system in accordance with the present invention.

FIG. 1 is an overview of a preferred embodiment of a Fibre Channel network communication system 100 in accordance with the present invention. The Fibre Channel network communication system comprises a fabric 102 which is associated with a plurality of fabric elements. As used herein, a fabric is a Fibre Channel switched network. Each switch in the network is called a fabric element. Fabric 102 comprises a plurality of switches associated with ports 104A, 104B, and 105 that internally connect the ports such that data into one port of the switch can be output from any of the other ports. An F_Port is a label used to identify a port of a fabric that is used to communicatively couple the fabric with an N_Port. An N_Port is a label used to identify a device, such as a computer or peripheral, which is coupled to the fabric using point-to-point topology. In FIG. 1, two public devices, 106A and 106B, are communicatively coupled to the fabric 102 via the F_Ports, 104A and 104B, respectively. A public device is a Fabric attached device, such as a computer or peripheral, that logs into the fabric to obtain a Fibre Channel address, for example, a 24-bit Fibre Channel address. The public device then uses the Fibre Channel address, also known as a Port_ID, to communicate with other devices. An FL_Port is a label used to identify a port of a fabric that is used to communicatively couple the fabric 102 with a loop. In FIG. 1, a loop 108 is communicatively coupled to the fabric 102 via FL_Port 105. In a preferred embodiment, the loop 108 utilizes an arbitrated loop with ring connections for providing multiple nodes with the ability to arbitrate access to a shared bandwidth. Loop 108 is associated with a plurality of ports labeled NL_Ports, 110A, 110B, 110C, 110D, and 11E. An NL_Port is a label used to identify a device, such as a computer or peripheral, which is coupled to the fabric using a loop topology. In FIG. 1, a private device, 11E, is communicatively coupled to the fabric 102 via the NL_Port 110E, loop 108, and FL_Port 105. A private loop device is a device, such as a computer or peripheral, that operates in a Fibre Channel Private Loop Direct Attach (FC-PLDA) environment and preferably uses 8-bit addresses, also known as Arbitrated Loop Physical Addresses (AL_PAs) to communicate with other devices. One skilled in the art will appreciate that the present invention is not limited to a Fibre Channel communication system as illustrated in FIG. 1 but that other configurations of a Fibre Channel communication system may also incorporate the principles of the present invention.

In accordance with the present invention, a public device 106A may send frames to and receive frames from a private device 110E. Accordingly, the present invention comprises a phantom device mapping, an address translation, a frame payload translation and a CRC regeneration to accomplish this. An address translation is either a public-to-private address translation, or a private-to-public address translation. A frame payload translation is either a request payload translation, or a response payload translation.

In a preferred embodiment, private loop device 110E is assigned a Port_ID and registered to Simple Name Server (SNS), preferably using a device probing method which is described in detail in U.S. patent application Ser. No. 09/100,445, entitled "Probing Device" by Jieming Zhu, Paul Ramsay, Vince Guan, and Kha Sin Teow. Through SNS queries (FC-GS), public device 106A learns about private loop device 110E and its Port_ID. Using the Port_ID, public device 106A initiates communication with private device 110E. Because the private loop device's Port_ID is a conventional fabric address, the frames containing the private device's Port_ID as the destination address are routed by the fabric (possibly across multiple switches) to the FL_Port 105 to which the private loop device 110E is coupled.

Upon the initial communication from a public device 106A to a private loop device 110E, a phantom AL_PA is assigned for the public device 106A and a mapping is established between the phantom AL_PA(aa) and the public device's Port_ID. Preferably, the mapping is created at the FL_Port 105 to which the private loop device 110E is coupled. Once created, the phantom device mapping preferably remains until the public device 106A is disconnected from fabric 102. When the public device 106A is disconnected from fabric 102, the phantom device mapping preferably is removed and the assigned phantom AL_PA is relinquished for other uses.

Similarly, public device 106B learns about private device 110E and its Port_ID through SNS queries, and initiates communication with private device 110E. Upon the initial communication from public device 106B to private loop device 110E, a phantom AL_PA is assigned to public device 106B, and a phantom device mapping is created between public device 106B and the phantom AL_PA (bb). A phantom AL_PA assigned to a public device at FL_Port 105 virtually creates a phantom device on loop 105.

With the phantom device mapping, FL_Port 105 converts all communication between a public device, 106A or 106B, and private loop device 110E as if the communication were between a phantom device (112A or 112B, respectively) and private loop device 110E (as indicated by the dashed lines). Specifically, it does so by performing a public-to-private address translation in one direction, and private-to-public address translation in the other direction.

Figure 2:
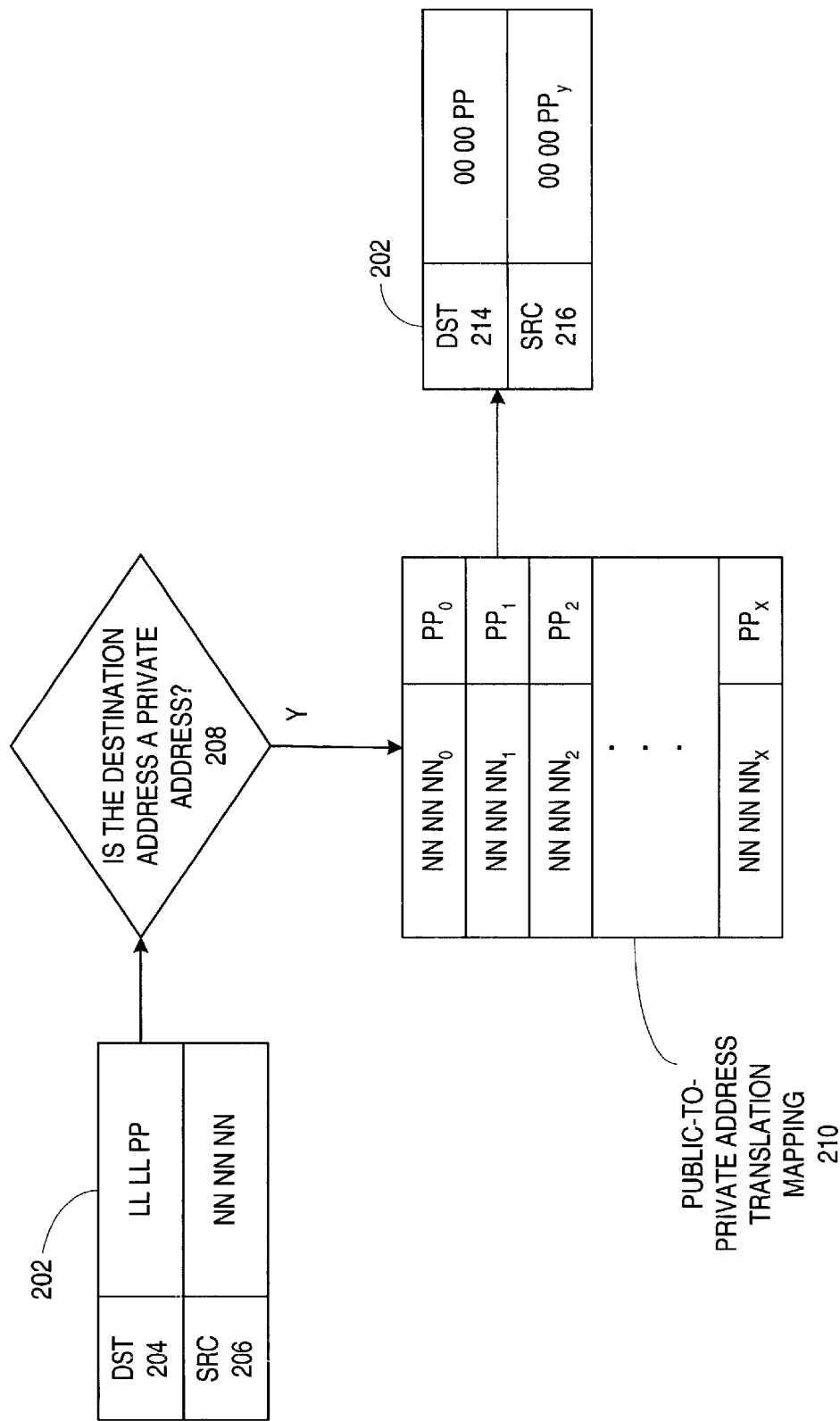
FIG. 2 is a functional block diagram of a preferred embodiment of a public-to-private address translation process.

FIG. 2 is a functional block diagram of a preferred embodiment of a public-to-private address translation for sending a frame 202 from a public device 106A to a private loop device 110E. As used in FIGS. 2 and 3, the notation "(NN NN NN)x" is a fabric-assigned address which refers to a fabric-attached device that has logged into the fabric. Preferably, this type of address is used by all devices coupled to the fabric to communicate across the fabric. The notation "00 00 PP" refers to a private loop address where "PP" refers to the local loop address or Arbitrated Loop Physical Address (AL_PA). The notation "LL LL PP" refers to a public loop address where "LL LL" is the Domain ID and Area ID assigned by the fabric for the loop and "PP" refers to the local loop address or AL_PA. As described above with reference to FIG. 1, this address is typically a fabric-assigned address for a device attached to loop 108 coupled with FL_Port 105. Generally, the value of "LL LL" is the same for all loop devices attached to the same loop.

During the public-to-private address translation process, the destination address 204 of the frame 202 transmitted from public device 106A is evaluated 208 to determine if the destination address 204 is an address for a private loop device, such as private device 110E, or a public device. In a preferred embodiment, this determination is made by FL_Port 105 by a device type table lookup. If the lookup result indicates that the destination device is a public device, then no translation is performed and the frame is forwarded in conventional manner. If the lookup result indicates that the destination device is a private loop device, then the source address 206 is converted to a phantom AL_PA. Preferably, the public-to-private address translation uses a Port_ID to phantom AL_PA mapping table and finds an entry where the Port_ID matches the source address (NN NN NN). The public-to-private address translation replaces the source address of the frame with the phantom AL_PA of the matched entry, and the destination address with the AL_PA only of the destination device. Generally, the new destination address 214 is created by replacing the upper two bytes (LL LL) of the original destination 204 with (00 00). Thus, after translation, frame 202 contains a new destination address 214 and a new source address 216, where both addresses are preferably of the form {0x0000, AL_PA}. Thus, the present invention enables a public device to appear as a phantom private device on a loop and therefore allows a frame sent from the public device to the private loop device to be transmitted to the loop.

Figure 3:
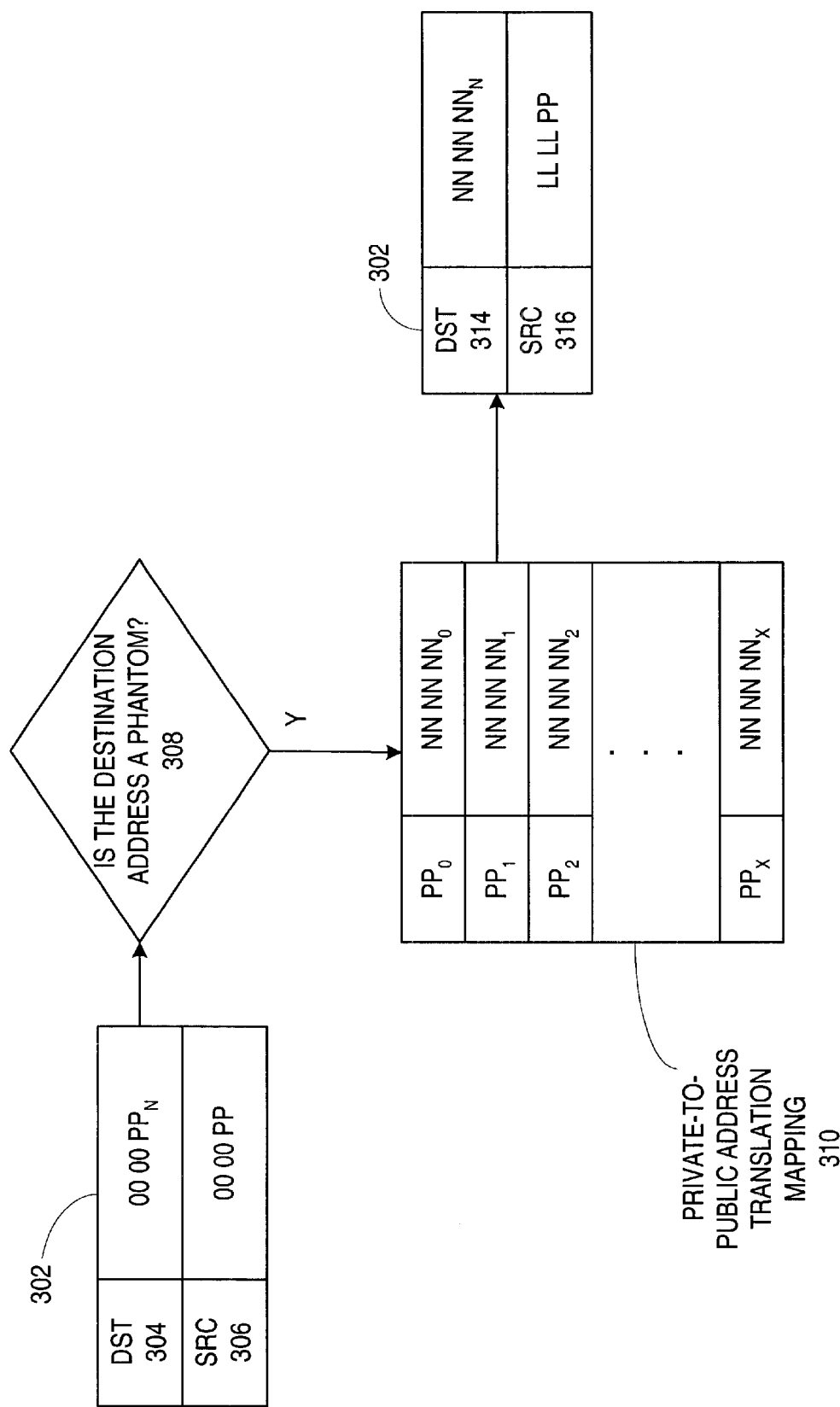
FIG. 3 is a functional block diagram of a preferred embodiment of a private-to-public address translation process.

FIG. 3 is a functional block diagram of a preferred embodiment of a private-to-public address translation process for sending a frame 302 from a private loop device 110E to a public device 106A. In a preferred embodiment, a frame 302 includes a destination address 304 and a source address 306. During the private-to-public address translation process, the destination address 304 of the frame 302 transmitted from private loop device 110E is evaluated 308 to determine if the destination address is a phantom device. Preferably, this determination is made by FL_Port 105 by a device type table lookup. If the lookup result indicates that the destination address is a phantom address, then the destination address is converted to a Port_ID of a public device, such as that of public device 106A. Preferably, the private-to-public address translation uses a phantom AL_PA $(PP)_n$ in the destination address $(00\ 00\ PP)_n$. The private-to-public address translation replaces the destination address of the frame with the Port_ID of the matched entry, and the source address with the fabric assigned address of the private device.

Generally, the new source address 316 is created by replacing the upper two bytes (00 00) of the original source address 306 with (LL LL). Thus, after translation, frame 302 contains the actual destination address 314 of public device 106A and a full fabric source address 316 for the private loop device 110E. Therefore, the present invention advantageously enables a private loop device to appear as a public loop device and therefore, to allow frames sent from the private loop device to the public device to be transmitted across the fabric.

Every frame between public device 106A and private loop device 110E requires an address translation, either a public-to-private or a private-to-public address translation. In addition, if the frame content (called payload) contains any address information, it is also changed accordingly. Typically, these types of frames are Extended Link Services (ELS) in Fibre Channel, and they are either ELS request or response frames.

Figure 4:
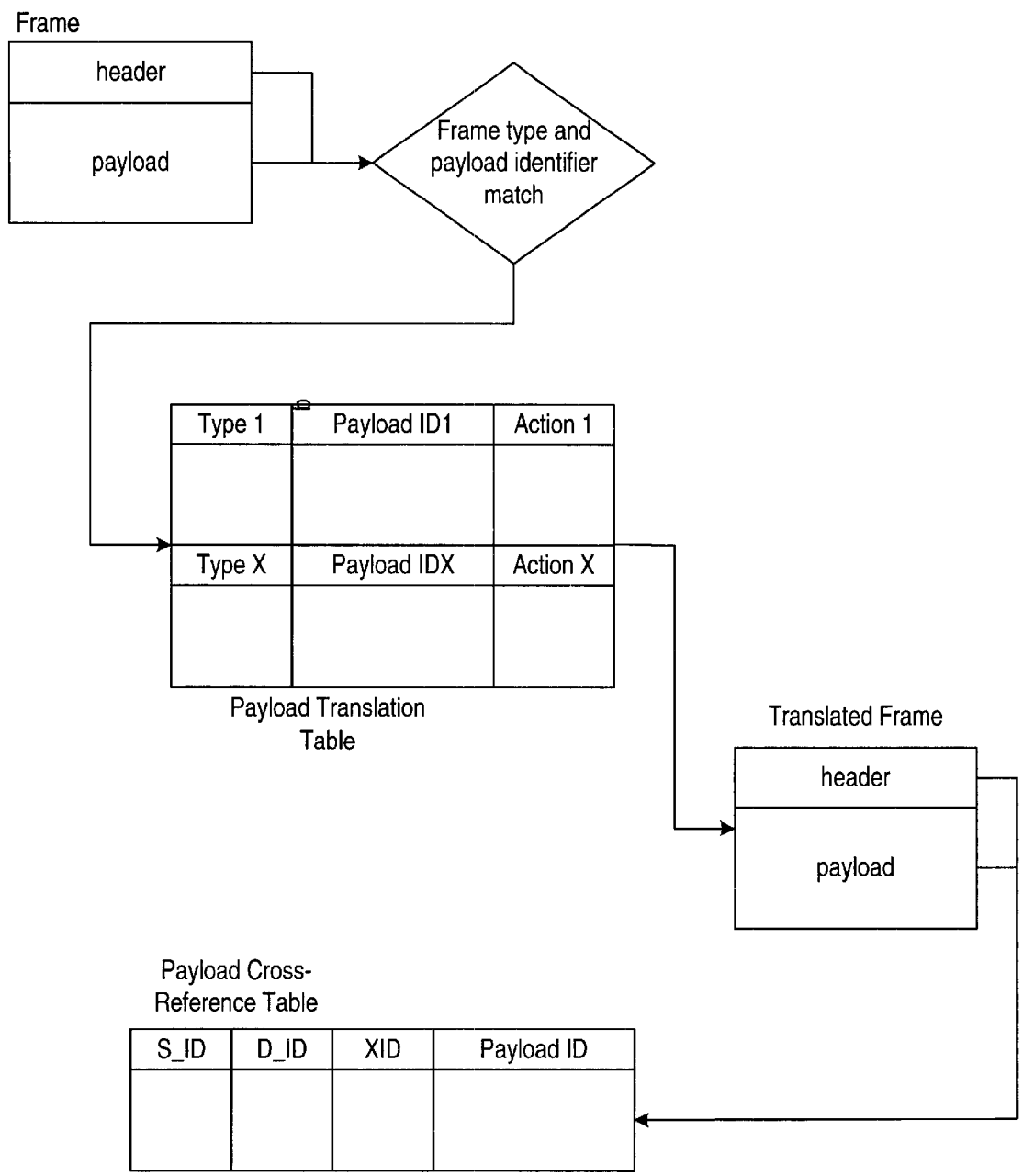
FIG. 4 is a block diagram of a preferred embodiment of a request payload translation.

FIG. 4 is a functional block diagram of a preferred embodiment of an ELS request payload translation. An ELS request payload translation process is required if the source address and/or the destination address of a frame being transmitted between a public device and a private device are part of the payload. An ELS request payload translation may be performed during a public-to-private translation or during a private-to-public translation.

During the ELS request payload translation process, the frame type and Extended Link Services command code are examined to determine if payload translation is required. These are examined using an ELS request payload table which stores information on the frame type, command codes, and the information of fields to be modified. If payload translation is required, one or more fields in the frame payload is translated according to the ELS request payload table. If an ELS request payload translation is performed, the information for that frame is stored in a request payload cross-reference table. The request payload cross-reference table can then be used during an ELS response payload translation as described in more detail below with reference to FIG. 5.

Figure 5:
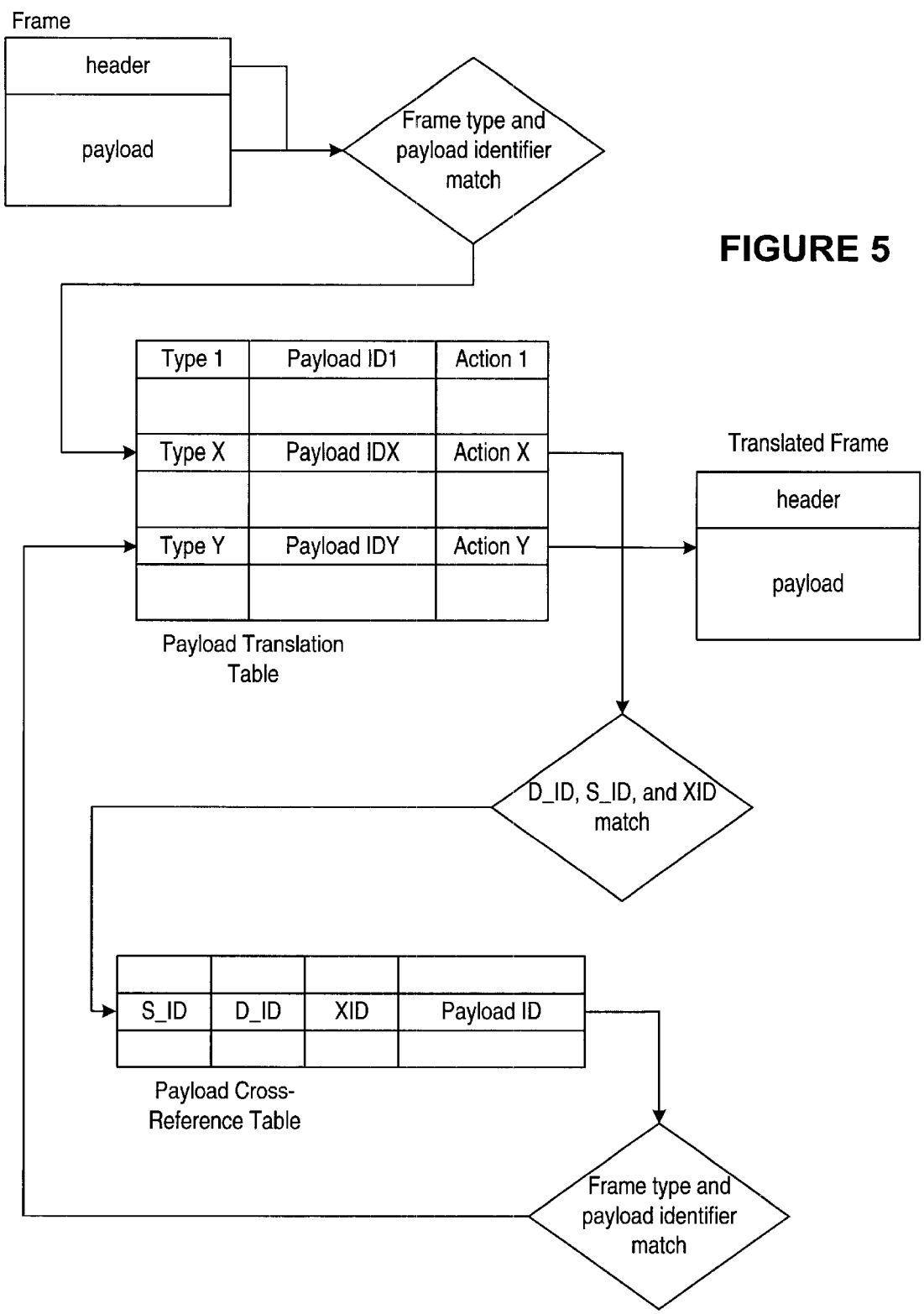
FIG. 5 is a block diagram of a preferred embodiment of a response payload translation.

FIG. 5 is a functional block diagram of a preferred embodiment of an ELS response payload translation process. An ELS response payload translation process is required if the source address and/or the destination address of a frame being transmitted between a public device and a private device are part of the payload. An ELS response payload translation may be performed during a public-to-private translation or during a private-to-public translation, and occurs subsequent to an ELS request payload translation.

During an ELS response payload translation, the frame type and Extended Link Services response code are examined to determine if payload translation is required. If the response code is of a certain specific value, such as ACC or ABTX, then the request payload cross-reference table generated by the ELS request payload translation process is cross-referenced to determine which fields in the payload need to be changed. The indicated fields are then changed accordingly.

Each frame transferred from a public device to a private loop device, or vice versa, includes a CRC checksum. According to the Fibre Channel standard, the CRC checksum covers the entire frame including the frame destination, source addresses, and the payload. Since the destination and source addresses of each frame are always translated, regardless of whether the payload is translated or not, CRC must be regenerated. A CRC checksum is calculated for a frame after all necessary translations (address and payload) are performed. Preferably, the CRC is calculated and appended to a frame by a hardware circuitry, but one skilled in the art will realize that many alternative methods exist for recalculating the CRC, and that the present invention is not limited to the specific embodiment enclosed.

In a preferred embodiment, an address translation is performed by a hardware component for performance reasons. However, a design may vary with respect to the arrangement of device type tables and phantom device mapping tables, as well as with respect to the table lookup and/or search algorithms. With respect to the current invention, a "port-based" address translation is described below in detail with reference to FIGS. 6 and 7. A "switched-based" public-to-private address translation is described below in detail with reference to FIGS. 8, 9, and 10, and an "AL_PA-based" private-to-private address translation is described below in detail with reference to FIGS. 11, 12, and 13. A "port-based" address translation is one where a device type table and a phantom device mapping table are maintained in each FL_Port of a switch. A "switch-based" address translation is one where a device type table and a phantom device mapping table is maintained in each switch for all ports coupled to the switch. An "AL_PA-based" address translation is one that is similar to the "port-based" address translation, except that every AL_PA can be potentially assigned a phantom, rather than allowing only a limited number of AL_PAs to be assigned a phantom.

Embodiment of a Port-Based Public-to-Private Translation

Figure 6:
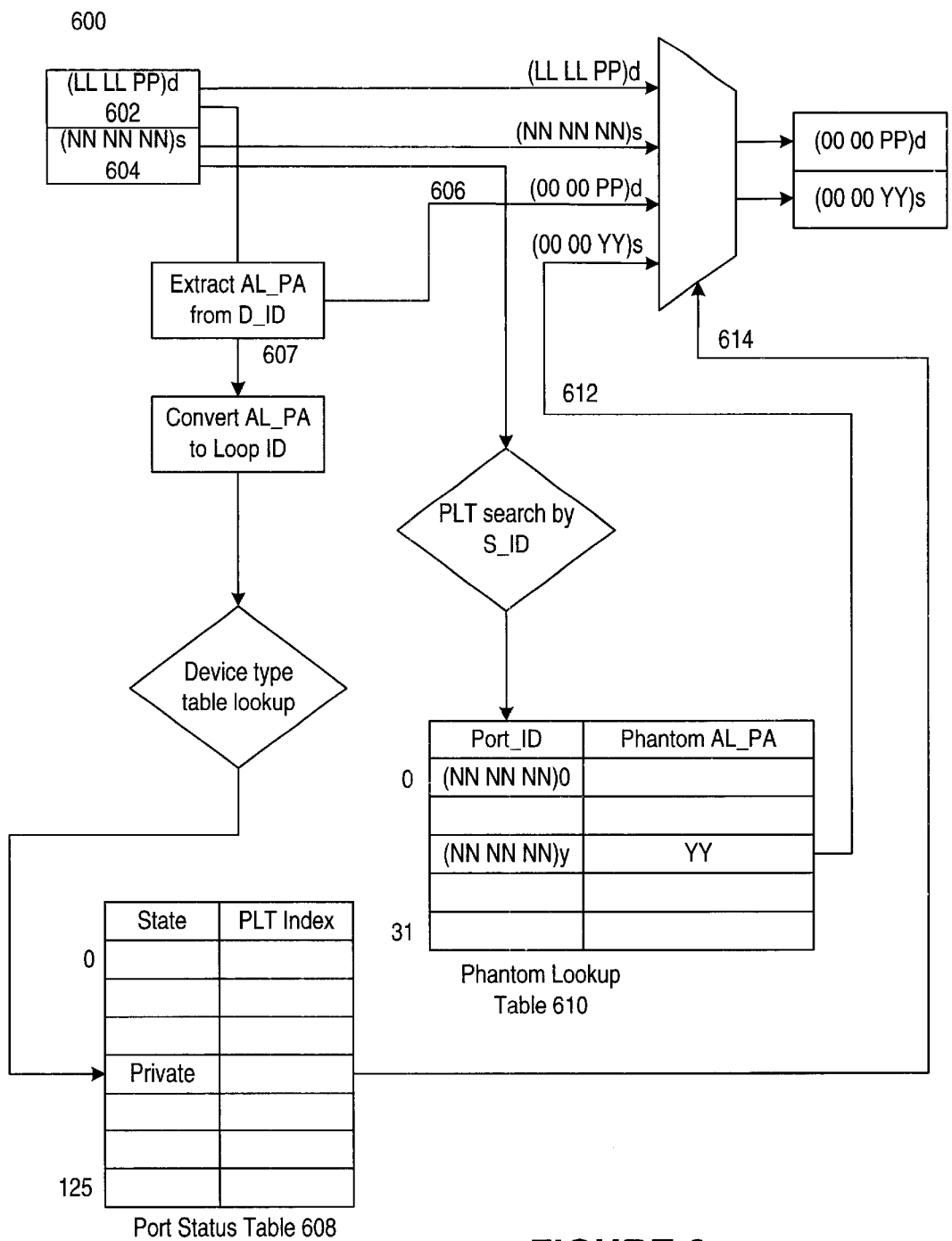
FIG. 6 is a functional block diagram of a preferred embodiment of a port-based public-to-private address translation in accordance with the present invention.

Referring now to FIG. 6, there is shown a functional block diagram of a preferred embodiment of a method for sending frames from a public device to a private device using a public-to-private address translation in accordance with the present invention. The steps of the method are preferably performed in the FL_Port 105. A frame 600 being sent from a source device to a destination device includes a destination address 602 and a source address 604, "(LL LL PP)d" and "(NN NN NN)s" respectively. The AL_PA of the destination device, PP, is extracted 606 from the destination address 602 of the frame. In other words, the least significant byte "PP" of the destination address (LL LL PP)d is extracted from the frame 600. The AL_PA of the destination device, "PP", is converted 607 to a private loop address, "00 00 YY", and is outputted to an address selector 612.

During the same time frame, the public-to-private address translation conducts a sequential search on the Port_ID field of a "Phantom Lookup Table" (PLT) 608 using the source address 604, (NN NN NN)s. The sequential search continues until a match is found, and a corresponding phantom AL_PA 609, "XX", for the N_Port ID of the source address 604 is outputted 610 to the address selector 612. The phantom AL_PA 609 is used to create a phantom address, "00 00 XX" for the source device.

The AL_PA of the destination device is also used to index an address in a Port Status Table (PST) 608 to determine whether the destination device is a private device or a public device. The PST is preferably stored in RAM. The output of the state bit field in the addressed PST RAM is used 614 as a control signal to select the translated addresses "00 00 YY" and "00 00 XX" if the entry in the PST indicates that the destination device is a private device. Otherwise, if the PST indicates that the destination device is not a private device, then the original source and destination addresses, (LL LL PP)d and (NN NN NN)s, are retained.

Embodiment of a Port-Based Private-to-Public Translation

Figure 7:
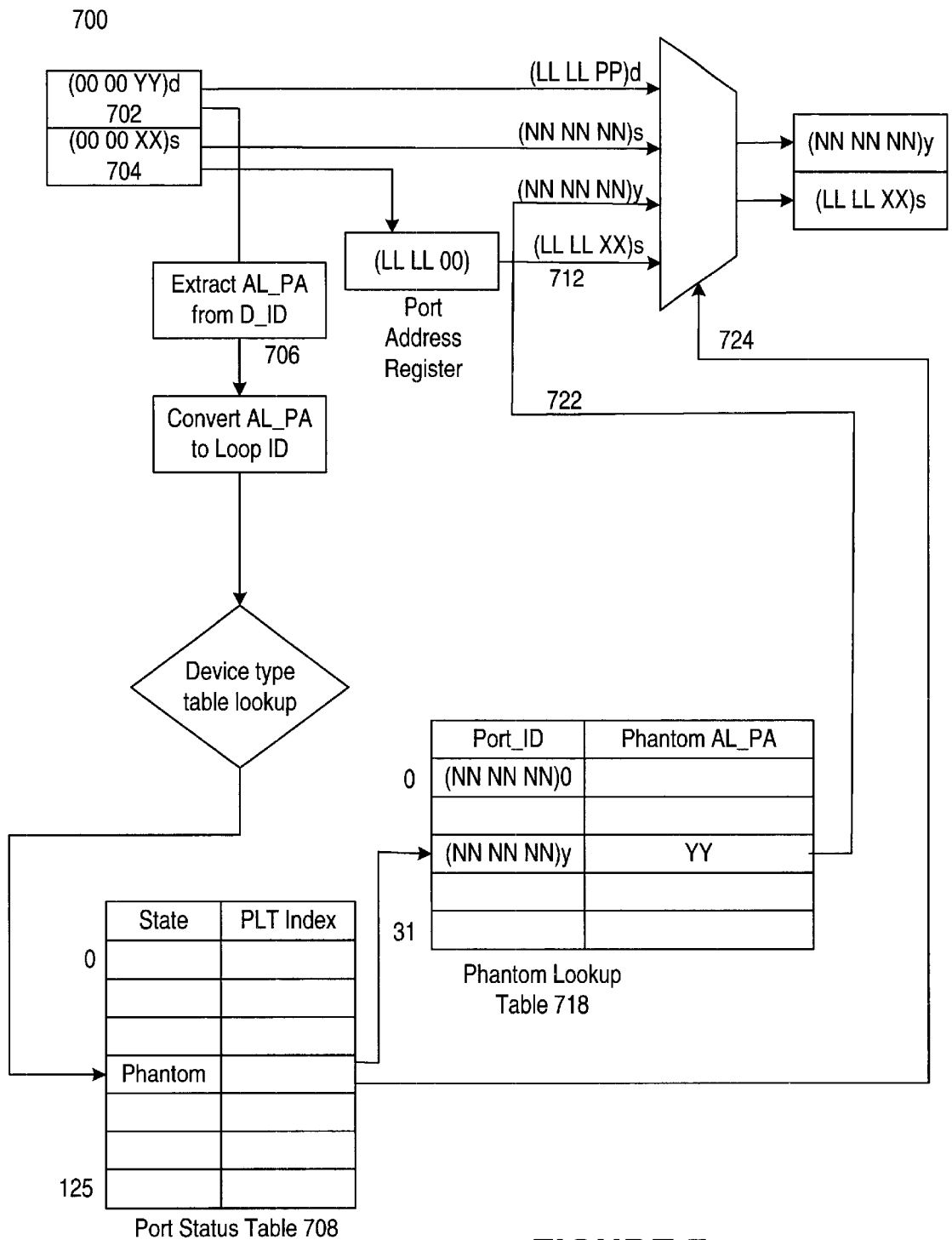
FIG. 7 is a functional block diagram of a preferred embodiment of a port-based private-to-public address translation in accordance with the present invention.

Referring now to FIG. 7, there is shown a functional block diagram of a preferred embodiment of a method for sending a frame from a private device to a public device using a private-to-public address translation in accordance with the present invention. The following steps of the method are performed at the FL_Port 105. A frame 700 being sent from a source device to a destination device includes a destination address 702 and a source address 704, "(00 00 XX)d" and "(00 00 YY)s" respectively. The AL_PA of the destination device is extracted 706 from the destination address 702 of the frame 700. In other words, the least significant byte "XX" of the destination address (00 00 XX)d is extracted from the frame 700. The destination AL_PA, XX, is converted to a Loop ID (FC–AL) which is used as an index 708 to address the PST. The output of the PLT index field 708 in the addressed PST RAM is used to address the PLT RAM 718. The Port_ID field output 720 of the addressed PLT RAM 718 is inputted 722 to the address selector 714.

In the same time frame, the AL_PA of the source device is extracted from the source address 704. In other words, the least significant byte, "YY", of the source address (00 00 YY) is extracted from the frame 700. The source AL_PA, "YY", is concatenated with a value stored in a Port Address Register 710 to form the translated source address, (LL LL YY)s, which is then inputted 712 into an address selector 714.

The output of the state bit field in the addressed PST RAM 608 is used as a control signal 724 to select 730 the translated addresses, (NN NN NN)d and (LL LL YY)s, if the state bit field indicates that the destination device address is a phantom address. Otherwise, if the destination device is not a phantom device, the original frame addresses are used.

Embodiment of a Switched-Based Public-to-Private Translation

Figure 10:
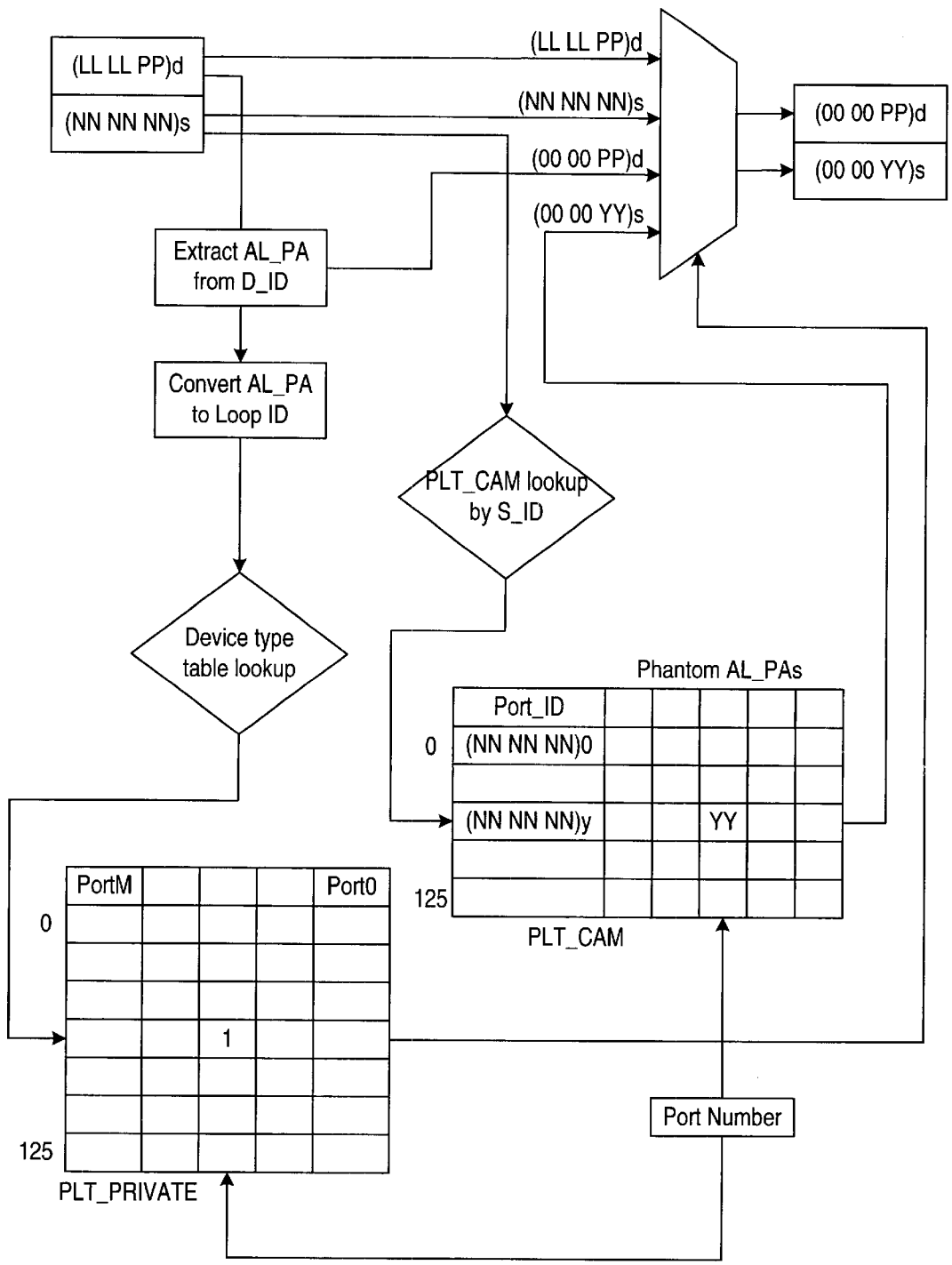
FIG. 10 is a functional block diagram of a preferred embodiment of a switch-based public-to-private address translation.

Referring now to FIG. 10, there is shown a functional block diagram of an embodiment of a switch-based public-to-private address translation for sending frames from a public device to a private device. The switch-based public-to-private address translation is similar to that of the port-based method; however, the phantom AL_PA is done using a PLT_CAM lookup as opposed to a sequential table search, and the Port_ID of the FL_Port to which the destination device of a frame to be translated is coupled is passed along with the destination addresses to the translation logic to index a corresponding column of both the PLT_CAM and PLT_PRIVATE. A frame being sent from a public device to a private device is examined to determine if 1) the Domain or Area of the destination address is not equal to zero; 2) the local port domain is equal to the domain of the destination address; and 3) the area and AL_PA of the destination address indicates that the destination device is a private device. The PLT_PRIVATE table is used for making these determinations. Referring now to FIG. 8, there is shown a block diagram of a private device table, PLT_PRIVATE, used in a switch-based public-to-private address translation mapping of another preferred embodiment in accordance with the present invention. Preferably, each row number of the PLT_PRIVATE table corresponds to a valid AL_PA index, and each column corresponds to a port of a switch. If an entry is set, then the corresponding AL_PA on that port is private. If an entry is not set, then the corresponding AL_PA on that port is public. Preferably, there are a total of 126 rows and MAX_PORT columns in the PLT_PRIVATE table. As used herein, MAX_PORT refers to the total number of ports in a switch. Thus, for example, AL_PA index 0 (which corresponds to AL_LA 0xef) on port 0 loop is public, but it is private on a loop that is coupled to port 1.

The source address of the frame is then used to check against the PLT_CAM table to obtain the phantom AL_PA for the source address of the public source device. Referring now to FIG. 9, there is shown a block diagram of a preferred embodiment of a Content Addressable Memory used in the public-to-private address translation. Preferably, each entry of the PLT_CAM is a full 24-bit Port_ID. Associated with each entry, there is a list of AL_PAs, one per port. Thus, given a source address or Port_ID, the PLT_CAM will return the index of its entry. This index and the destination port number determine the phantom AL_PA. For example, in FIG. 9, any frame from source address=0x20200 destined to Port 1 will have a phantom AL_PA of 0xEF. Preferably, there are a total of 126 entries in the PLT_CAM. The original source address of the frame is then replaced with a new source address for the public device which comprises the phantom AL_PA and with the domain and area forced to zero. In addition, the CRC of the frame being sent from the public device to the private device is recalculated.

AL_PA-Based Private-to-Public Address Translation

Figure 13:
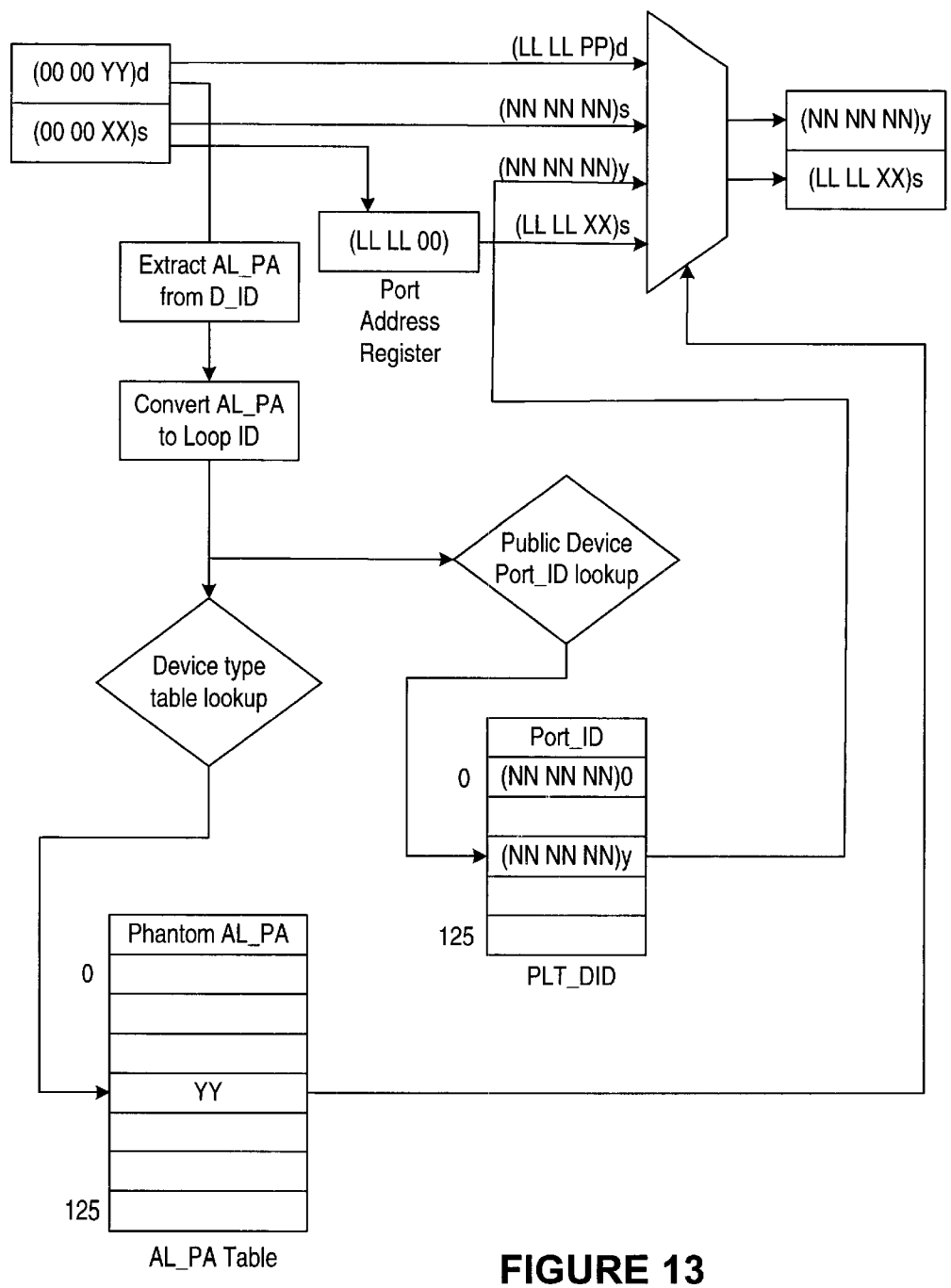
FIG. 13 is a functional block diagram of a preferred embodiment of an AL_PA-based private-to-public address translation.

Referring now to FIG. 13, there is shown a functional block diagram of a preferred embodiment of an AL_PA-based private-to-public address translation for transferring frames from a private device to a public device in accordance with the present invention. The AL_PA-based private-to-public address translation is similar to that of the port-based method; however, the translated destination address is done by a lookup using the Loop ID corresponding to the phantom AL_PA.

Figure 11:
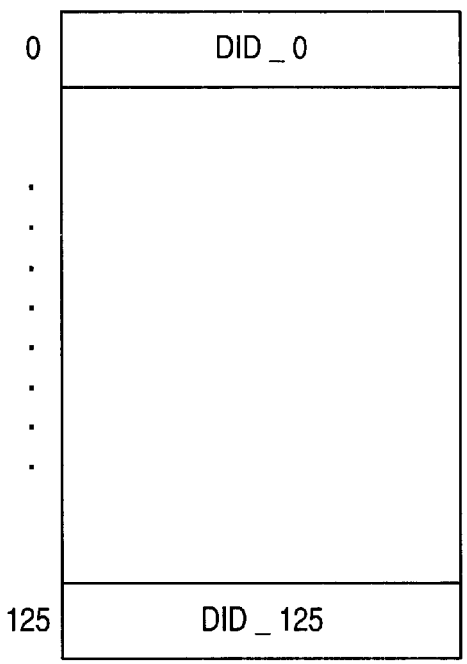
FIG. 11 is a block diagram of a preferred embodiment of an AL_PA-based private-to-public address translation mapping in accordance with the present invention.

In a frame being sent from a private device, the Domain and Area of the destination address is zero. Thus, the present invention uses the AL_PA of the destination address to get a full 24-bit translated destination address from an AL_PA-based private-to-public address translation mapping, (hereinafter referred to as the PLT_DID table). Referring now to FIG. 11, there is shown a block diagram of a preferred embodiment of an AL_PA-based private-to-public address translation mapping. This full 24-bit address is a format for the address for a public device.

A frame being sent from a private device to a public device is then examined to determine if 1) the Domain of the translated destination address does not match the local port domain; or 2) the Domain of the translated destination address matches the local port Domain, but the translated destination address is a public one. This is accomplished by applying the Area and AL_PA of the translated destination address to the PLT_PRIVATE table.

If the above conditions are satisfied, the destination address of the frame is then replaced by the translated destination address. The Domain and Area of the source address is then replaced by those from the local port ID, by adding the switch Domain ID and the Area number. Preferably, the AL_PA of the source address is not changed. Additionally, the CRC of the frame is recalculated. If the conditions specified above are not satisfied, then the destination device is another private device and the frame is not translated.

Figure 12:
FIG. 12 is a block diagram of a preferred embodiment of an AL_PA list used in an AL_PA-based private-to-public address translation process in accordance with the present invention.

Referring now to FIG. 12, there is shown a preferred embodiment of an AL_PA table used in a private-to-public address translation process. In order to intercept frames having a phantom AL_PA in their destination address, the FL_Port preferably recognizes all loop primitive sequences that have phantom AL_PAs as their destination AL_PAs. The AL_PA table stores all phantom AL_PAs for a private loop. The FL_Port will respond to any loop primitive sequence that has any phantom AL_PA in the destination address of the frame as if the destination of the loop primitive sequence were the FL_Port (AL_PA 0x00). Therefore, if a private AL_PA sends an OPN primitive with a phantom AL_PA in the destination address of the frame, then it will open the FL_Port.

Phantom AL_PA Assignment

In a preferred embodiment, phantom AL_PA assignment is done by a software component upon the initial communication from a public device to a private loop device. Typically, this initial communication is either an N_Port Login (PLOGI), Discover N_Port Service parameters (PDISC), or Discover Address (ADISC) Extended Link Services frame. When a frame from a public device to a private loop device reaches the FL_Port 105 to which the private device is coupled, if the process of address translation of the destination AL_PA is found to be private and the source address is found to have no phantom AL_PA mapping, (i.e. either the PLT search found no matching entry or the PLT lookup fails), the frame is passed to software through an interrupt. When the software responds to the interrupt and gets the frame, the software will attempt to assign a phantom AL_PA and create a mapping between the source address and the phantom AL_PA. This is preferably accomplished by a phantom AL_PA bitmap and a loop AL_PA bitmap collected from the Loop Initialization Sequences (FC–AL). When a phantom AL_PA is to be assigned, preferably it finds the first bit that is not set in both the phantom AL_PA bitmap and the loop AL_PA bitmaps. If such as bit is found, it assigns the corresponding AL_PA as the phantom AL_PA for the device (which is identified by the source address of the frame), and sets the bit in the phantom AL_PA bitmap so that preferably, the AL_PA will not be reassigned until the bit is cleared. The order that the software uses to find a bit is from the first word bit 29 to bit 0 of the bitmaps, and the second word bit 31 to bit 0, then the third word bit 31 to bit 0, and then forth word bit 31 to bit 0. Thus, once a phantom AL_PA is assigned and the bit is set in the phantom AL_PA bitmap, the software also programs the tables, PST and PLT, or PLT_PRIVATE, PLT_CAM, and PLT_DID, in the FL_Port or switch ASIC so that they contain the new mapping information.

When a phantom AL_PA is assigned and a phantom device mapping is created in an FL_Port, the FL_Port assumes the functionality as of a private loop device on behalf of the public device to which the phantom AL_PA is assigned (in addition to its normal functionality). In other words, it acts as an agent of the public device to transmit frames to and receive frames from the loop. More specifically, when a frame from a public device to a private device arrives at the FL_Port, after necessary translation of the frame, it arbitrates and wins the loop, opens the private device, and transmits the frame to the private device when a BB_Credit is received from the private loop device. On the other hand, when a private device arbitrates and wins the loop, opens a phantom AL_PA, the FL_Port responds by issuing BB_Credits to the private loop device, and receives frames from the device. After necessary translations, the FL_Port forwards the frames to the corresponding public device across the fabric.

Once a phantom AL_PA is assigned, it will be preserved until the device to which it is assigned is removed from the fabric. If the loop on which the phantom AL_PA resides is reinitialized, the FL_Port will mark the corresponding bit in the payload of the LIPA Loop Initialization Sequence (FC-AL to retain the AL_PA, and an RSCN (FC-FLA) is sent to the device to which the phantom AL_PA is assigned to inform it of the loop initialization, so that proper device authentication and recovery can be performed.

Frame Payload Translation

In a preferred embodiment, while the address translation is performed on a frame, the frame is also checked to determine if a frame payload translation is needed. This is preferably done by a combination of hardware and software components in the FL_Port. Before a frame is forwarded, the frame type is checked by the hardware, if the frame type is ELS, an interrupt is generated. In response to the interrupt, the software retrieves the frame from the hardware, and uses ELS code from the frame to look up a payload translation table, if the look up result indicates no payload translation is needed, then the frame is returned to the hardware for forwarding. Otherwise, if the look up result indicates that it is an ELS request that needs translation, the proper field in the payload is changed accordingly, and the destination address (D_ID), source address (S_ID), the originator exchange ID (OX_ID) and the ELS code of the frame are stored into a cross-reference table, then the frame is passed back to the hardware for forwarding. Preferably, the cross-reference table is stored in a dynamically allocated memory space. If the look up result indicates that it is an ELS response, then the software further uses the D_ID, S_ID and responder exchange ID (RX_ID) of the frame to lookup the cross-reference to determine the request to which the frame is responding, and if the lookup finds a matched entry, the proper field in the frame payload is modified in the same way as the corresponding request frame, and the entry is removed from the cross-reference table; otherwise, the payload is unchanged. Then the frame is returned to the hardware for forwarding.

From the above description, it will be apparent that the invention disclosed herein provides a novel and advantageous Fibre Channel switching system and method which allows public devices and private devices to communicate across the system. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An apparatus disposed in a communication system including a fabric, at least one public device coupled to the fabric, and at least one loop device coupled to a loop, the apparatus comprising:

a frame receiving component for receiving a plurality of frames from the at least one public device to be sent to the at least one loop device and a plurality of frames from the at least one loop device to be sent to the at least one public device, each frame including a source address and a destination address; and an address translation module, communicatively coupled to the frame receiving component, for (a) determining if the at least one loop device is a public or private device and if private, performing a public-to-private address translation on at least one of the plurality of frames received from the at least one public device and if public, forwarding the plurality of frames without address translation, and for (b) determining if the destination address provided by the at least one loop device is to a public or private device and if public, performing a private-to-public address translation on at least one of the plurality of frames received from the at least one private device and if private, forwarding the plurality of frames without address translation.

2. The apparatus of claim 1 wherein the address translation module assigns a phantom address to the plurality of frames received from the at least one public device.

3. The apparatus of claim 1 wherein the address translation module comprises a public-to-private address translation mapping having a plurality of fabric assigned addresses and a plurality of corresponding phantom addresses.

4. The apparatus of claim 1 wherein the address translation module converts the source address of the frame received from the at least one public device into a phantom address and the address translation module converts the destination address of the frame received from the at least one public device to a fabric-assigned private loop address.

5. The apparatus of claim 1 wherein the address translation module translates the phantom address of a frame received from the at least one loop device to an actual fabric-assigned address for the at least one public device.

6. The apparatus of claim 1 wherein the destination address o the frame received from the at least one loop device is converted from a phantom address to a fabric assigned address for the at least one public device, and the source address of the frame received from the at least one loop device is converted from a private loop address to a fabric-assigned address.

7. The apparatus of claim 1 wherein the address translation module converts a private loop address of the information frames from the at least one loop device to a fabric assigned address.

8. A method for transmitting a frame received from a public device to a loop device, the method comprising the steps of:

receiving a frame from the public device, the frame having a source address and a destination address;

determining if the destination address indicates a private loop device or a public loop device;

if the destination address indicates a private loop device, performing a public-to-private address translation on the frame received from the public device and transmitting the frame to the private loop device; and if the destination address indicates a public loop device, transmitting the frame to the public loop device without performing an address translation.

9. The method of claim 8 wherein the public device has a Port_ID.

10. The method of claim 9 wherein the step of performing a public-to-private address translation on the frame received from the public device comprises the substep of:

assigning a phantom AL_PA to the public device for establishing a mapping between the phantom AL_PA and the Port_ID of the public device.

11. The method of claim 8 further comprising the steps:

prior to transmitting the frame to the private loop device converting the source address into a phantom address if the destination address indicates a private loop device.

12. An address translation module for use in a communication system for sending a plurality of frames across a fabric between at least one loop device coupled to a local loop and at least one public device coupled to the fabric, each frame having a source address and a destination address, the address translation module comprising:

a destination device determination for determining if the destination device is a public or private device;

a public-to-private address translation mapping for performing a public-to-private address translation on at least one of the plurality of frames received from the at least one public device if the destination device is a private device; and a private-to-public address translation mapping for performing a private-to-public address translation on at least one of the plurality of frames received from the at least one loop device if the destination device is a public device.

13. The module of claim 12 wherein the public-to-private address translation mapping stores a plurality of fabric-assigned addresses and a plurality of corresponding phantom addresses.

14. The module of claim 12 wherein the public-to-private address translation mapping is used to convert the source address of at least one of the plurality of frames to a phantom address.

15. The module of claim 12 wherein the private-to-public address translation mapping is used to convert the source address of at least one of the plurality of frames to a fabric-assigned address.

16. A method for transmitting a frame received from a private loop device, the method comprising the steps of:

receiving a frame from the private loop device, the frame having a source address and a destination address;

determining if the destination address is to a public or private device;

performing a private-to-public address translation on the frame received from the private loop device if the destination address is to a public device; and transmitting the frame to the public device.

17. The method of claim 16 wherein the public device has a Port_ID.

18. The method of claim 17 wherein the step of performing a private-to-public address translation on the frame received from the private loop device comprises the substeps of:

converting the source address from a private loop address to a fabric-assigned address for the private loop device; and converting the destination address from a phantom address to a public address.

* * * * *